No. 783,765. PATENTED FEB. 28, 1905.
J. T. THORNE & G. SCHONASKY.
DUCK HUNTER'S BLIND.
APPLICATION FILED APR. 25, 1904.

2 SHEETS—SHEET 1.

No. 783,765. PATENTED FEB. 28, 1905.
J. T. THORNE & G. SCHONASKY.
DUCK HUNTER'S BLIND.
APPLICATION FILED APR. 25, 1904.

2 SHEETS—SHEET 2.

Witnesses:
Chas. E. Gaylord.
John Enders.

Inventors:
John T. Thorne and
George Schonasky
By Dyrenforth, Dyrenforth & Lee
Att'ys No. 783,765. Patented February 28, 1905.

UNITED STATES PATENT OFFICE.

JOHN T. THORNE AND GEORGE SCHONASKY, OF MARQUETTE, WISCONSIN.

DUCK-HUNTER'S BLIND.

SPECIFICATION forming part of Letters Patent No. 783,765, dated February 28, 1905.

Application filed April 25, 1904. Serial No. 204,703.

*To all whom it may concern:*

Be it known that we, JOHN T. THORNE and GEORGE SCHONASKY, citizens of the United States, residing at Marquette, in the county of Green Lake and State of Wisconsin, have invented a new and useful Duck-Hunter's Blind, of which the following is a specification.

Our invention relates to improvements in the construction of blinds employed by duck-hunters.

It is a fact well known to hunters that certain species of ducks, notably mallard ducks, are very apt to fly shy of any bunches of grass, rushes, or other covers large and dense enough to conceal a hunter, and thus manage generally to keep out of gunshot of such a cover. For this reason the grass and rush blinds hitherto commonly employed do not answer their purpose as effectively as is desired by hunters.

Our object is to provide a blind of generally-improved construction which may rest upon water as a covering for a boat and by being provided as nearly as possible of the color of the water fail to attract such attention from the birds as to cause them to shy off and fear to approach.

It is further our object to provide such a blind of a construction such as will render it particularly light, capable of being folded into a small compass for portability, and easy to unfold and adjust in desired operative position.

Figure 1:
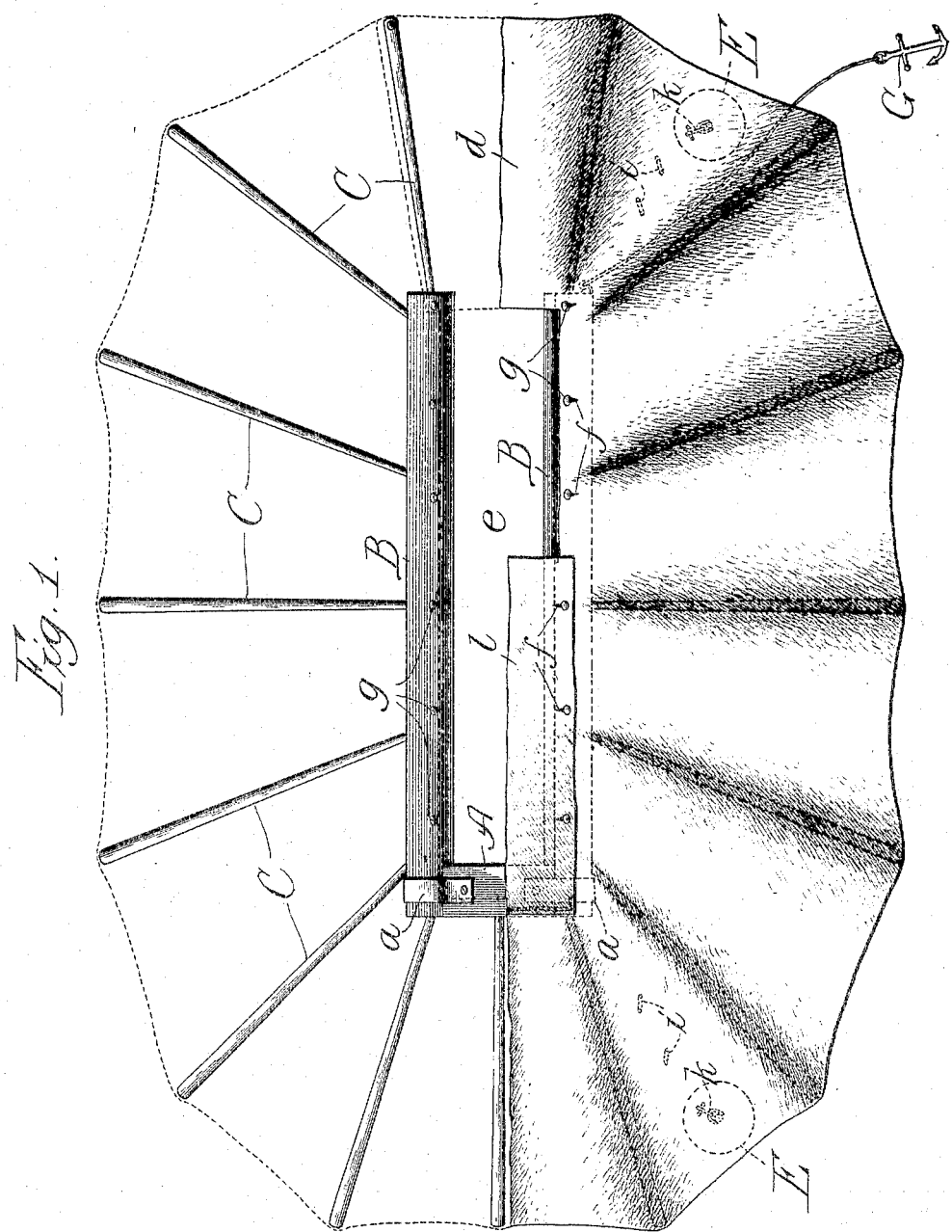
Figure 2:
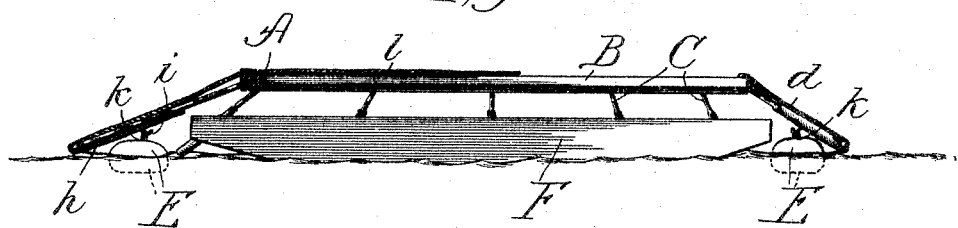
Figure 3:
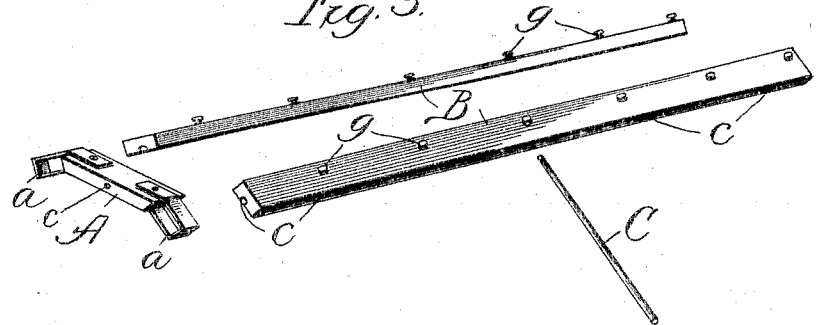

In the drawings, Figure 1 is a top plan view of our improved blind unfolded, the flexible covering material for the frame being broken away at one side; Fig. 2, a longitudinal section of the blind on a reduced scale and showing it in operative position on the water and covering a boat; Fig. 3, a view in perspective of parts of the frame of the blind separated from each other, and Fig. 4 the flexible and folding cover for the frame detached.

Figure 4:
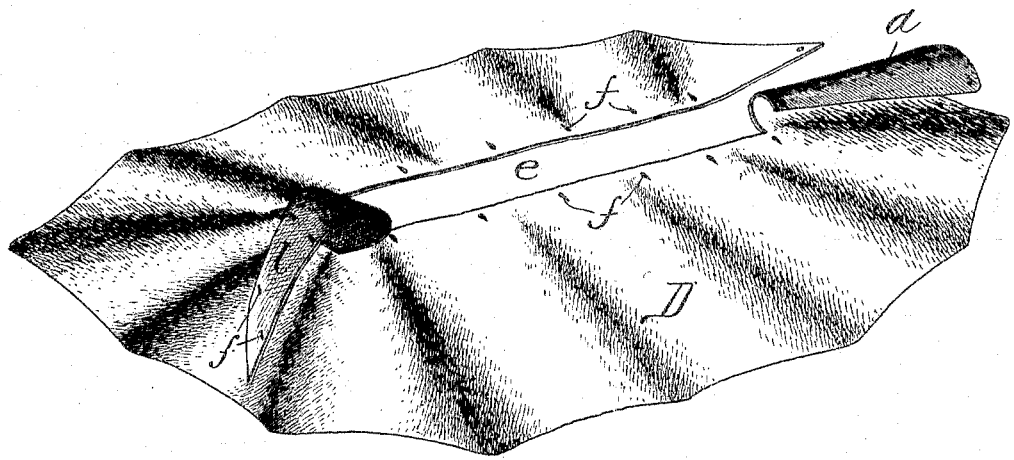

The main frame of the blind, as we prefer to construct it, is formed with an end bar A, provided at opposite ends with metal loops or stirrups $a\ a$, extending at an angle to the bar, as shown in Fig. 3. B B are side bars adapted to fit at their ends through the stirrups $a$ and extend parallel with each other at the same relative inclinations as the stirrups $a$. In the bar A and ends and outer edges of the bars B are sockets $c$, adapted to receive the ends of rods C. D is a sheet of flexible material, which may be canvas or the like, formed when stretched out, as shown in Fig. 4, with side lengths closed together at one end and provided with a gap-closing flap $d$ at the opposite end. Between the side lengths is an oblong opening $e$, adapted to register with the opening in the main frame, and in the edges of the material around said opening are button-holes $f$, adapted to engage studs or buttons $g$ on the main frame. The sheet is formed on its under side with a series of pockets $h$, just large enough to receive the rods C, which thus support the flexible cover in extended position around the main frame. On the under side of the covering D, adjacent to the four corner portions of the blind, are hooks or loops $i$.

E E are floats of any suitable construction having means, such as straps or the like $k$, for attaching them to the loops $i$.

The blind is large enough to cover a boat F while sustained by the floats E upon the water. An anchor G is connected, preferably, with the open end of the main frame. A flap $l$ at the end of the opening $e$ opposite the flap $d$ is also provided at opposite edges with button-holes $f$ to engage the buttons $g$ on the main frame.

The parts A, B, and C of the main frame may be detached from each other, as shown in Fig. 3, and the cover D wrapped about them, thus making a comparatively small bundle to be carried in a duck-boat. When it is desired to place the device in position, the rods C are placed in the pockets $h$, though in practice it is never necessary to remove them from said pockets. The ends of the bars B are then slipped into the stirrups $a$ and the rods C inserted into the openings $c$ around the frame. The openings $c$ are bored in the parts A B at angles which tend to cause the rods C to extend in a downward-inclined direction and at the relative angles indicated in Fig. 1. When the rods are thus placed in position, the buttonholes $f$ will register with the buttons $g$ for attachment thereto. Thus buttoning of the cover to the main frame tends to holds the rods C rigidly in place and maintain all the parts in proper relation. The floats E are then attached to loops $i$, whereby the four corner portions of the blind will rest thereon in the water. We prefer to provide a series—say three loops $i$—at each corner portion, so that the blind may be caused to extend at the center of the main frame at different elevations, as desired, above the water. The anchor G will serve to hold the blind so that it will extend therefrom in the direction with the wind. The boat F may be passed into the blind through the open end of the latter, after which the flap $d$ may be buttoned down. The hunter draws the flap $l$ over to shield the lower part of his body while he lies in the boat, and the buttoning down of this flap serves to hold the parts of the frame in still further rigid relation.

In practice we prefer to provide the flexible cover or canvas D with a coating of waterproof paint or the like of a color as nearly as possible resembling that of the sheet of water. Thus the boat and hunter will be hidden by a sheet so nearly resembling the surface of the water that it would scarcely be visible, and decoys set out beyond the end of the blind to windward will attract ducks into range.

The opening between the bars B beyond the flap $l$ is sufficiently large to permit the hunter to rise to a sitting position through the opening before firing. Another flap like the flap $l$ may be provided to be buttoned over the balance of the opening $e$ to serve when desired as a protection for the hunter against rain.

While we prefer to construct our improved blind in all its details as herein shown and described, the construction may be variously modified without departing from the spirit of our invention as defined by the claims.

What we claim as new, and desire to secure by Letters Patent, is—

1. A duck-hunter's blind, comprising an open frame, a covering for the frame formed of flexible material secured to the edges of the frame-opening and having an opening for the ingress and egress of a duck-boat, and sustaining-floats for said blind.

2. A duck-hunter's foldable blind comprising an open frame, a covering for the frame formed of flexible material colored to resemble the color of the surrounding water and secured to the edges of the frame-opening and having a controllable opening for the ingress and egress of a duck-boat, and sustaining-floats removably fastened to said blind.

3. A duck-hunter's blind comprising an open frame formed of separable sections, a foldable covering for the frame formed of flexible material stiffened at intervals and colored to resemble the color of the surrounding water and secured to the edges of the frame-opening and having a controllable opening for the ingress and egress of a duck-boat, and means independent of said boat for sustaining the blind.

4. A duck-hunter's blind comprising an open frame formed of separable sections, a foldable covering for the frame formed of flexible material colored to resemble the color of the surrounding water and removably secured to the edges of the frame-opening and having an opening for the ingress and egress of a duck-boat, and floats attachable to the blind at different points to vary the elevation thereof.

5. In a blind for duck-hunters, the combination of a main frame comprising an end bar A, and side bars B, and means for removably securing said side bars to opposite ends of the end bar in parallel position with an opening between them, sockets in the frame disposed around the edges thereof, rods removably fitting said sockets, a flexible covering fastened to said rods and removably fastened to said frame, and floats fastened to different parts of the blind to sustain the same, all constructed and arranged to operate substantially as and for the purpose set forth.

JOHN T. THORNE.
GEORGE SCHONASKY.

Signed by John T. Thorne in presence of—
F. M. WIRTZ,
ALMA U. THORIAN.

Signed by George Schonasky in presence of—
E. F. PAUL,
L. B. DURBAN.